(12) United States Patent
Elhadeedy et al.

(10) Patent No.: US 12,225,445 B2
(45) Date of Patent: Feb. 11, 2025

(54) PROACTIVE TRANSCEIVER AND CARRIER AUTOMATED ARBITRATION

(71) Applicant: Motional AD LLC, Boston, MA (US)

(72) Inventors: Ahmed Elhadeedy, Carnegie, PA (US); Alejandro Olivares, Clariton, PA (US); Syed Tirmizi, Mars, PA (US); Nathaniel Dykstra, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 325 days.

(21) Appl. No.: 17/572,319

(22) Filed: Jan. 10, 2022

(65) Prior Publication Data
US 2023/0224794 A1 Jul. 13, 2023

(51) Int. Cl.
*H04W 40/20* (2009.01)
*H04W 40/02* (2009.01)
*H04W 40/30* (2009.01)

(52) U.S. Cl.
CPC ........ *H04W 40/026* (2013.01); *H04W 40/20* (2013.01); *H04W 40/30* (2013.01)

(58) Field of Classification Search
CPC . H04W 40/026; H04W 36/322; H04W 4/023; H04W 4/027; H04W 4/44;
(Continued)

(56) References Cited

U.S. PATENT DOCUMENTS 11,600,899 B2 * 3/2023 Fleischer ............. H01Q 1/3275
2017/0164423 A1 6/2017 Ross et al.
(Continued)

FOREIGN PATENT DOCUMENTS

WO 2016014214 A1 1/2016

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Hirdepal Singh
(74) *Attorney, Agent, or Firm* — Fish & Richardson P.C.

(57) ABSTRACT

Provided are methods for enhanced proactive transceiver and carrier automated arbitration for a vehicle. Some methods described include receiving route information representing a route to be traveled by the vehicle, and determining, based on a prediction model and the route information, a first connectivity score of a first transceiver and a second connectivity score of a second transceiver. Some methods described include comparing the first connectivity score against the second connectivity score, and selecting, based on the first connectivity score being greater than the second connectivity score, the first transceiver. Some methods described include determining, using location information, a current second connectivity score of the second transceiver, and connecting, based on comparing the current second connectivity score against the first connectivity score, the vehicle to the first transceiver or the second transceiver for performing wireless communications. Systems and computer program products are also provided.

22 Claims, 9 Drawing Sheets

(58) Field of Classification Search
CPC ....... H04W 4/46; H04W 40/20; H04W 40/30; H04W 88/06
USPC ...................................................... 455/452.1
See application file for complete search history.

(56) References Cited

U.S. PATENT DOCUMENTS

| | | | |
|---|---|---|---|
| 2019/0123433 A1* | 4/2019 | Lee | H01Q 3/34 |
| 2021/0044946 A1* | 2/2021 | Bhaskaran | H04W 76/14 |
| 2022/0038966 A1* | 2/2022 | Vitzrabin | H04W 36/14 |
| 2022/0053607 A1* | 2/2022 | Rice | H04B 17/318 |

OTHER PUBLICATIONS

International Search Report and Written Opinion in International Appln. No. PCT/US2023/010232, mailed on May 8, 2023, 13 pages.

International Preliminary Report on Patentability in International Appln. No. PCT/US2023/010232, mailed on Jul. 25, 2024, 9 pages.

\* cited by examiner

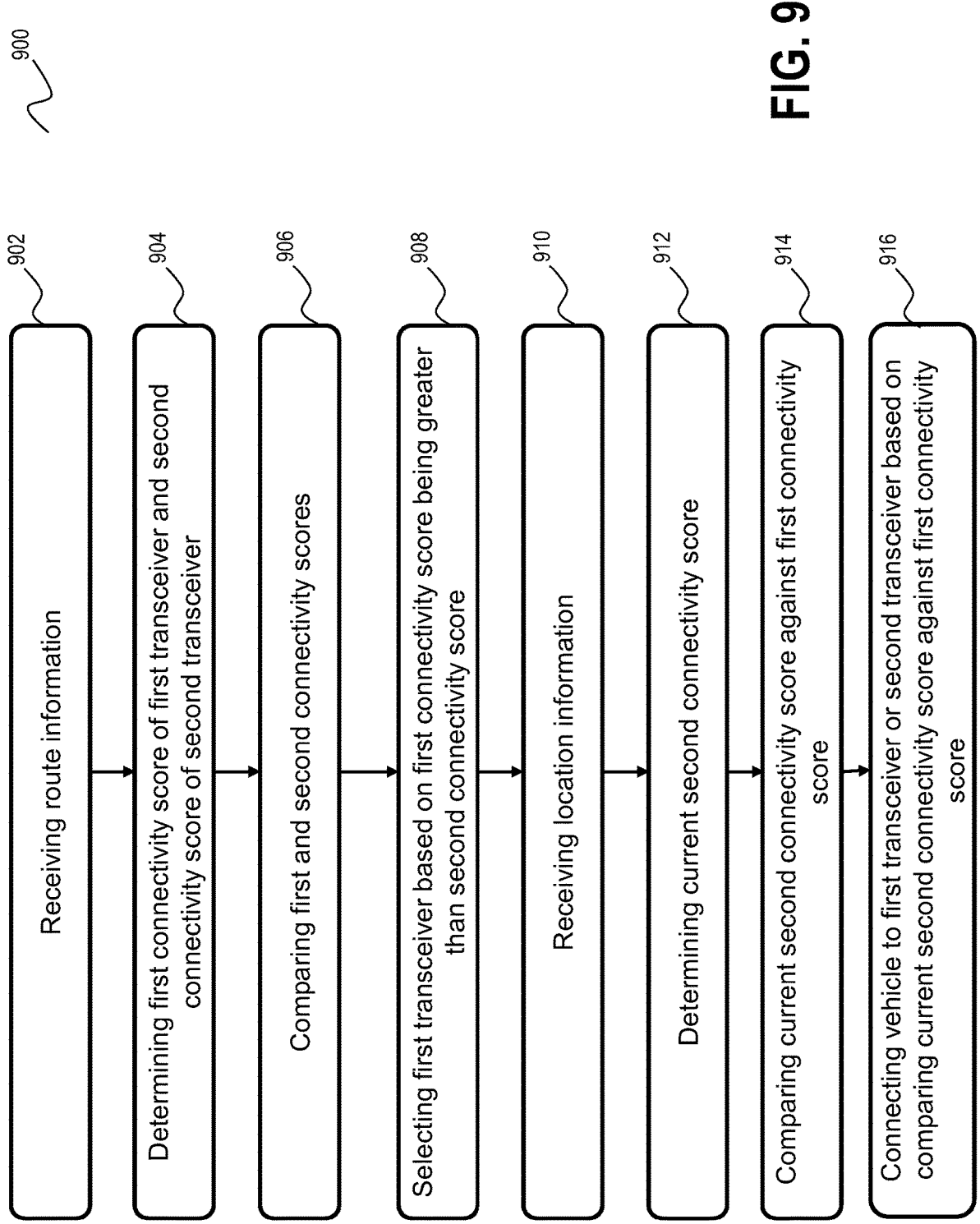

PROACTIVE TRANSCEIVER AND CARRIER AUTOMATED ARBITRATION

BACKGROUND

Vehicles that include telematics units can wirelessly connect to at least one object and/or to at least one cloud service. Some telematics units contain multiple modems and carriers. Determining which modem or carrier to use during operation of a vehicle can rely on some wireless connection parameters determined in real-time, which may cause performance issues. For example, if wireless connection of the vehicle becomes poor (e.g., signal strength decreases), some vehicle software will attempt to switch to an improved wireless connection. However, the transition to the improved wireless connection may result in a drop in wireless communication performance due at least to the poor wireless connection experienced prior to the transition.

BRIEF DESCRIPTION OF THE FIGURES

FIG. 9 is a flowchart of a process for enhanced proactive transceiver and carrier automated arbitration; and

DETAILED DESCRIPTION

Figure 1:
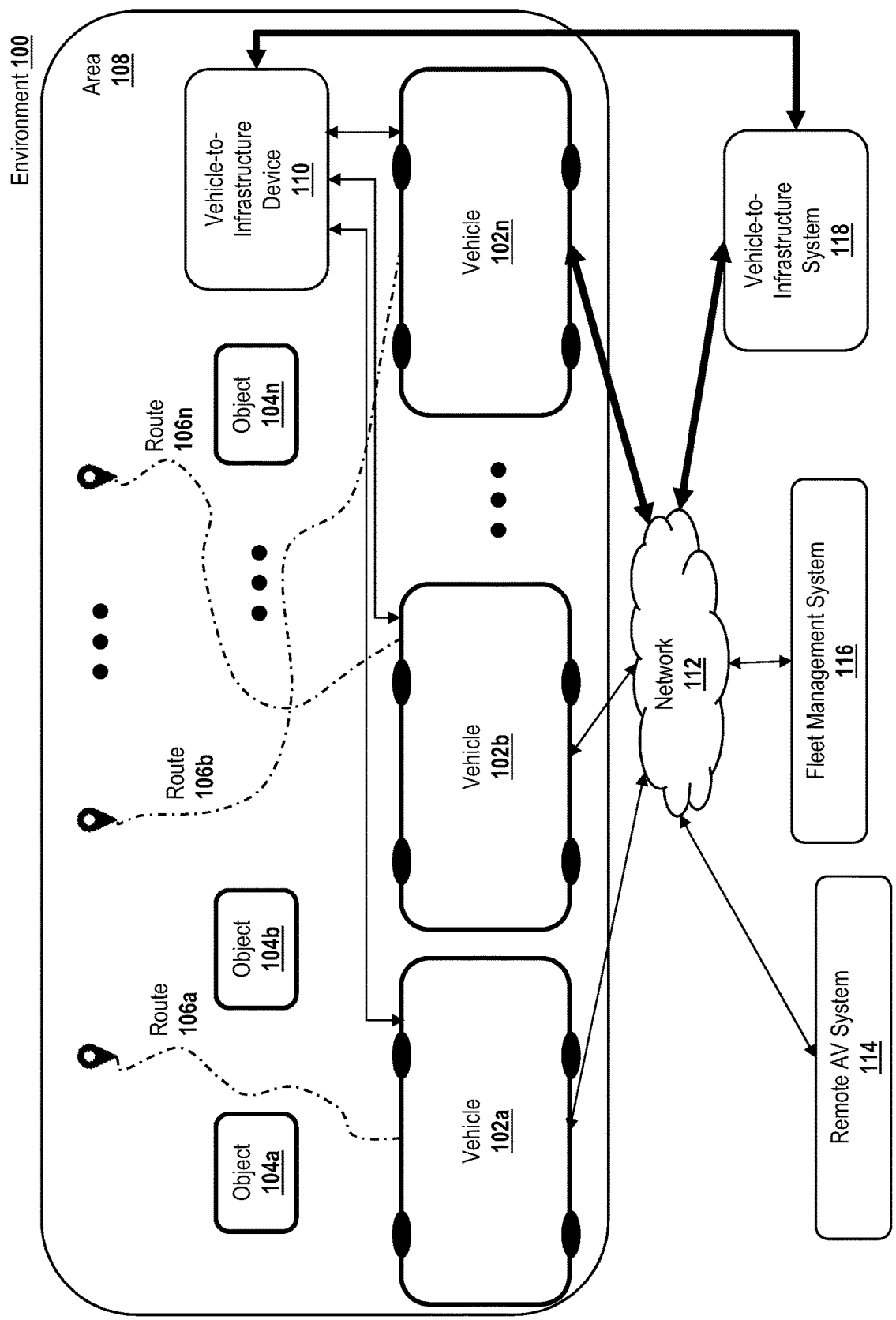
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement proactive transceiver and carrier automated arbitration for a vehicle (e.g., autonomous vehicle). For example, the vehicle includes a control system (e.g., including at least one processor) that receives vehicle location information and/or route information (e.g., at least one predetermined route to be traveled by the vehicle). In some embodiments, the control system includes a prediction model that determines a first connectivity score associated with a first transceiver of the vehicle, which is based on the received location and/or route information. For example, the control system determines connectivity scores for each transceiver (e.g., modem) associated with the vehicle, such as a second connectivity score associated with a second transceiver. The control system compares connectivity scores to determine a highest connectivity score associated with a transceiver having a best wireless connectivity at a location and/or along a route.

For example, the control system of the vehicle selects a transceiver having a highest connectivity score to perform at least some of the wireless communications associated with the vehicle. To ensure the transceiver having the highest connectivity score at a location and/or along a route is selected by the control system, the control system determines at least one connectivity score in real-time. For example, the real-time connectivity score is determined based on at least a current vehicle location and/or a current driving condition. The control system compares the real-time or current connectivity score against the connectivity score determined by the prediction model for selecting the highest connectivity score and associated transceiver for performing wireless communications. In some embodiments, more than one carrier is associated with more than one transceiver associated with the vehicle and affects the selection of a transceiver by the control system for performing wireless communications.

By virtue of the implementation of systems, methods, and computer program products described herein, techniques for proactive transceiver and carrier automated arbitration is a proactive approach to select and pre-select transceivers and carriers based on at least a location of the vehicle, including before a wireless signal with a transceiver of the vehicle becomes poor. This proactive approach reduces cellular resources and channels needed during active wireless communications with the vehicle as the need to communicate with backup transceivers is reduced. Further, vehicle cellular connectivity will be enhanced due to pre-selecting transceivers along a predetermined route having best expected wireless signal strength (e.g., highest connectivity scores), as well as real-time confirmation and wireless connection updates, as needed, to ensure best available wireless signal strength is maintained with the vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
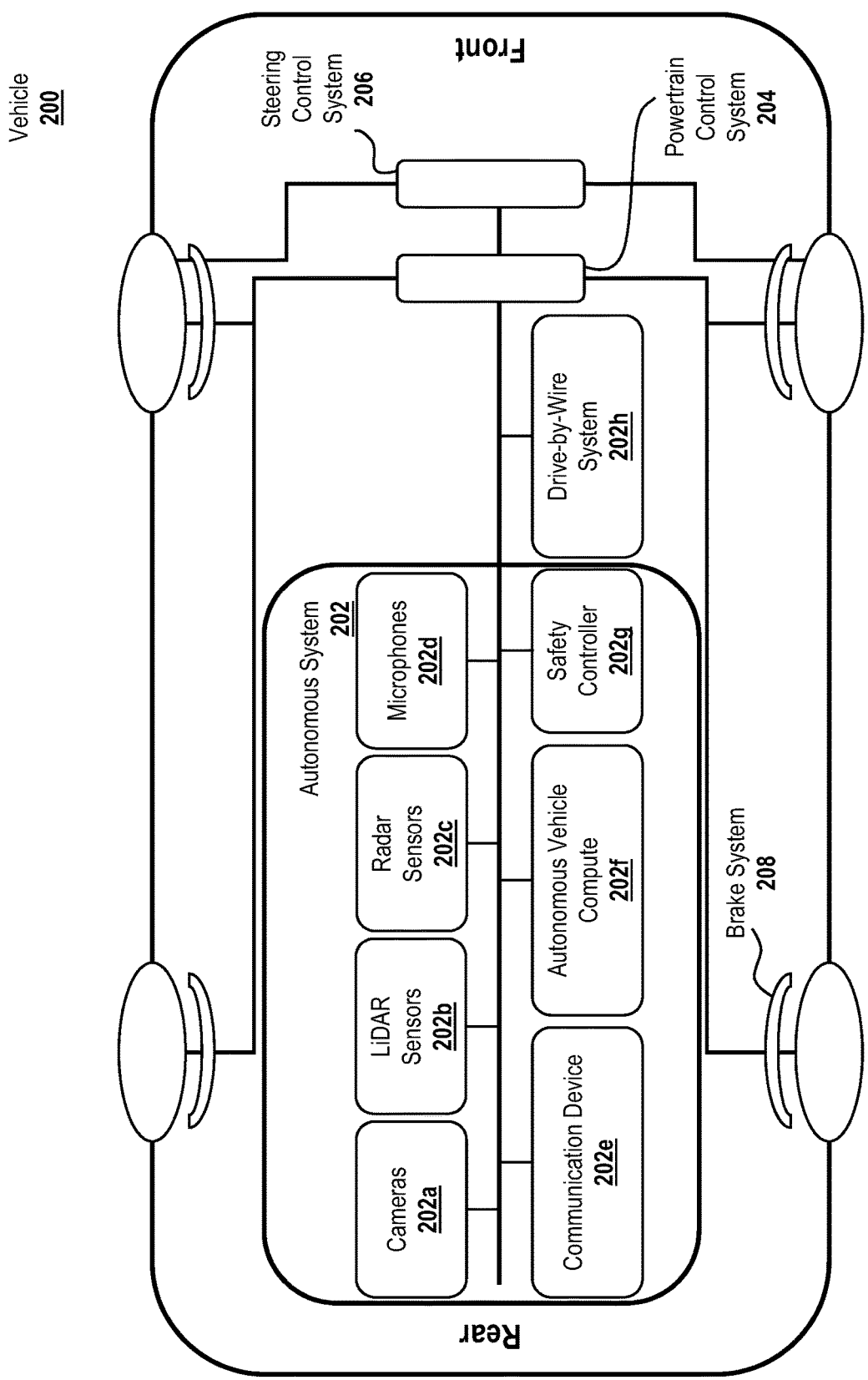
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
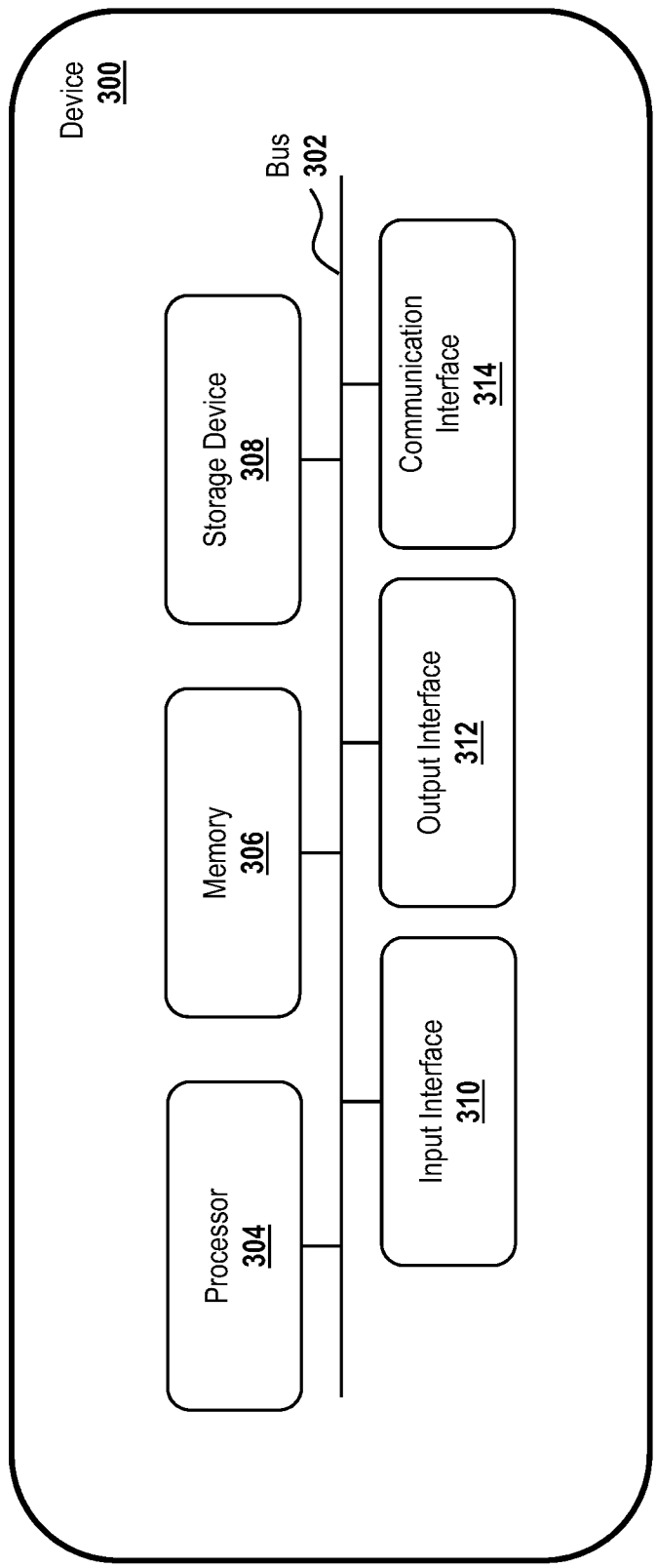
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a transceiver, a modem, a router, a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of autonomous vehicle compute 202f, and/or one or more devices of network 112 (e.g., one or more devices of a system of network 112). In some embodiments, one or more devices of vehicles 102 (e.g., one or more devices of a system of vehicles 102), include at least one device of autonomous vehicle compute 202f, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
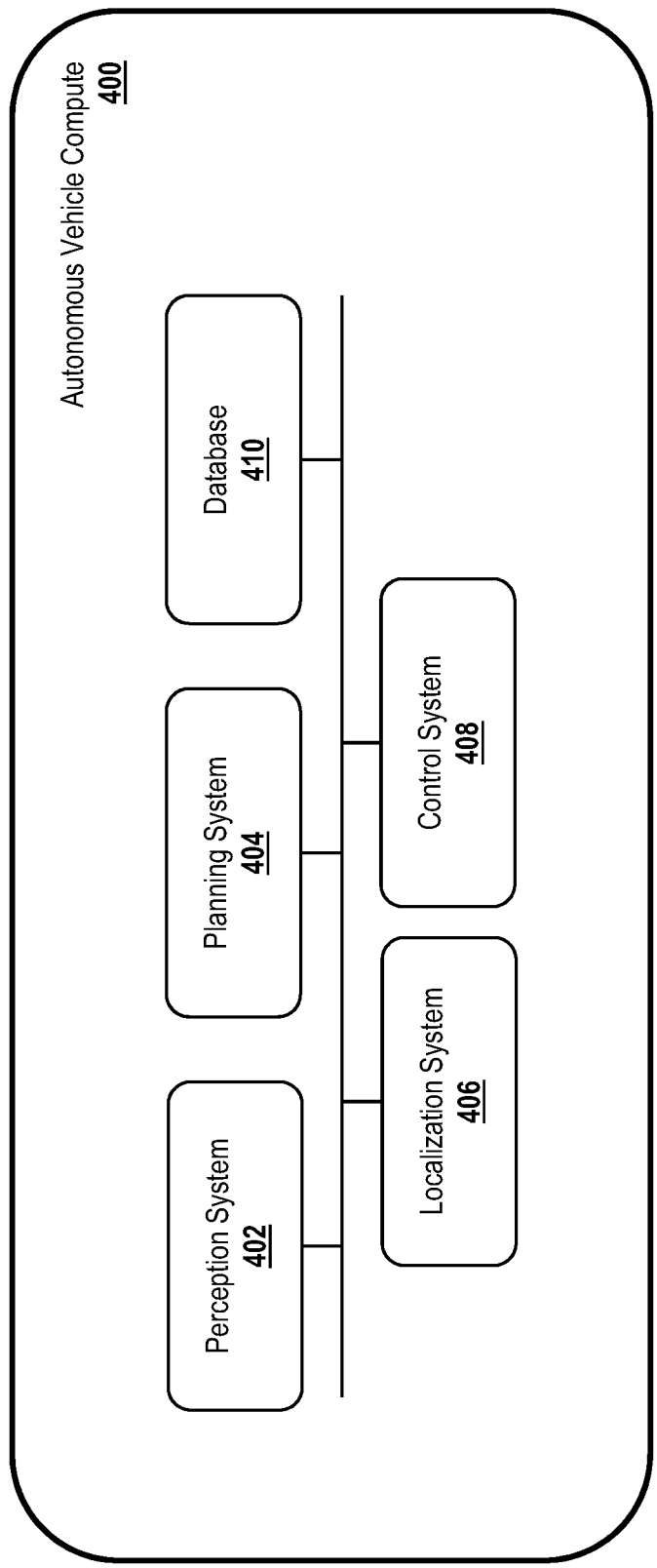
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, control system 408 receives data associated with a mapped location of the vehicle (e.g., from localization system 406) and/or a trajectory associated with the vehicle (e.g., route information from planning system 404), and uses a prediction model to assist with controlling wireless communication between the vehicle and at least the network 112. In some embodiments, the control system 408 includes and/or is in communication with a telematics control system (e.g., telematics control system 508 of FIG. 5) that controls wireless communication between the vehicle 502 and at least the network 112 to ensure a continuous and quality wireless connection between the vehicle and at least the network 112. For example, the control system 408 selects a transceiver (e.g., out of a selection of more than two transceivers associated with the vehicle) for forming wireless communications with at least the network 112. The control system 408 (e.g., the telematics control system 508) determines the transceiver to select based on at least a prediction provided by the prediction model and conditions associated with the vehicle 502 (e.g., current and planned locations) and wireless communication characteristics (e.g., signal strength).

For example, the control system 408 determines at least one connectivity score associated with at least one transceiver of the vehicle, including at least one predicted connectivity score and at least one current connectivity score.

The control system 408 selects the transceiver with the greatest connectivity score for providing wireless communications. In some embodiments, a type of carrier associated with at least one transceiver can affect which transceiver is selected, such as depending on a type of subscriber identification module (SIM) card (e.g., embedded SIM (eSIM) card) associated with the vehicle 502.

Figure 5:
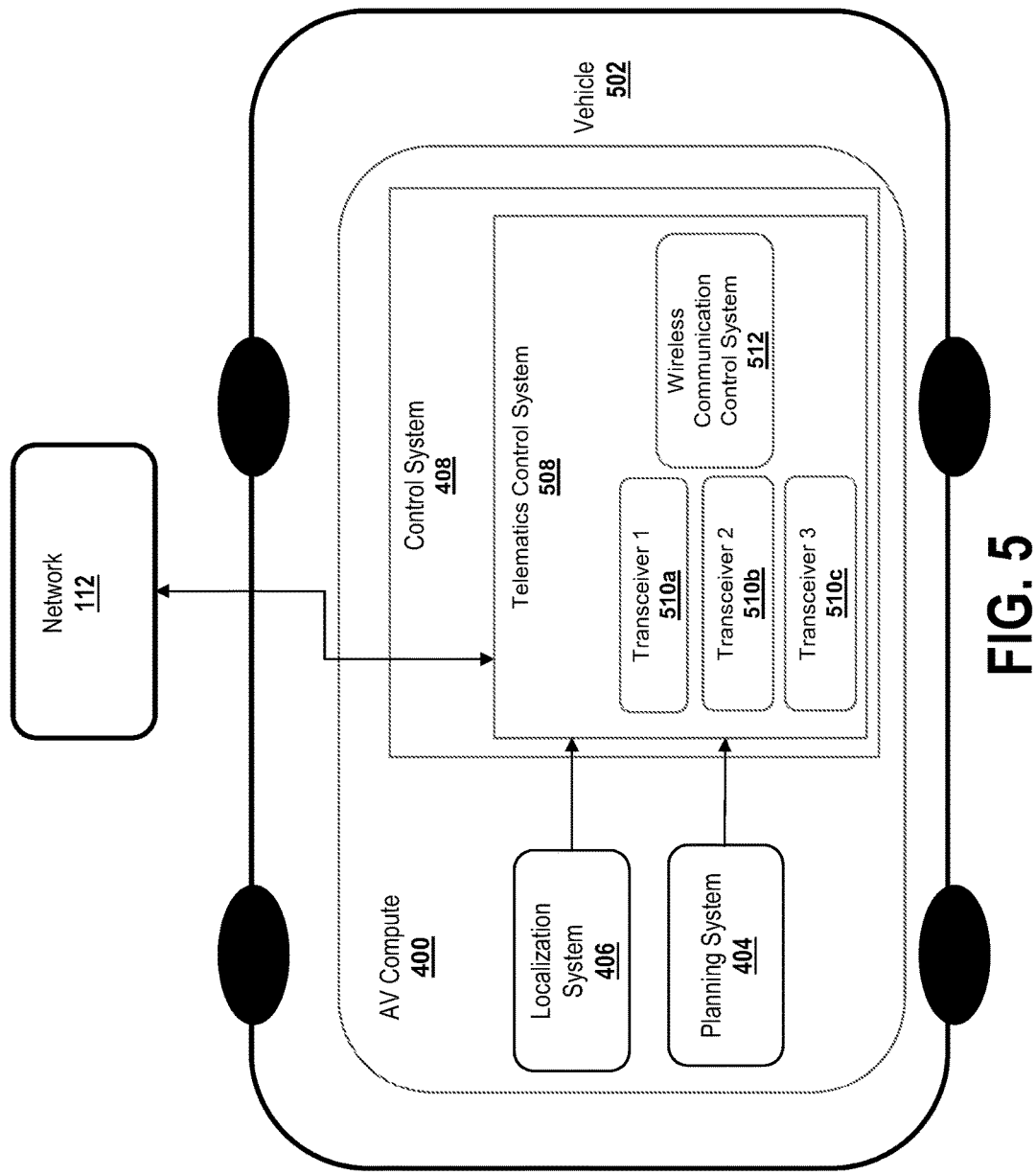
FIG. 5 is a diagram of certain components of an autonomous system.

Referring now to FIG. 5, illustrated is an example block diagram of an embodiment of the vehicle 502 (e.g., vehicles 102*a*-102*n* of FIG. 1 and/or vehicle 200 of FIG. 2) including an embodiment of the autonomous vehicle compute 400 (autonomous vehicle compute 202*f* of FIG. 2). As illustrated, the autonomous vehicle compute 400 includes a localization system (e.g., localization system 406 of FIG. 4) and a control system (e.g., control system 408 of FIG. 4). Additionally, or alternatively, in some embodiments, the control system 408 includes a telematics control system 508, as illustrated in FIG. 5. For example, the telematics control system 508 is configured to control wireless communications between the vehicle 502 and at least the network 112. In some embodiments, the telematics control system 508 includes at least two transceivers (e.g., modems, routers), such as a first transceiver 510*a*, a second transceiver 510*b*, and a third transceiver 510*c*. It will be understood that although FIG. 5 shows telematics control system 508 including three transceivers, the telematics control system 508 can include any number of transceivers. Each of the transceivers is associated with at least one carrier (e.g., wireless communications provider). For example, the vehicle 502 can include a SIM card that is configured to communicate with one or more carriers.

In some embodiments, the telematics control system 508 includes a wireless communication control system 512 that is configured to control which of the at least two transceivers are selected for providing wireless communications between the vehicle 502 and at least the network 112. For example, the wireless communication control system 512 includes a prediction model that is configured to predict a best wireless connection, as well as determine a current best wireless connection, between at least one transceiver and at least the network 112. The wireless communication control system 512 selects the transceiver (e.g., sends instruction's to the selected transceiver) having a best wireless connection for performing wireless communications, such as communicate between the vehicle 502 and at least the network 112.

In some embodiments, perception system 402, planning system 404, localization system 406, and/or control system 408, including telematics control system 508, implement at least one machine learning model (e.g., at least one multi-layer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408, including telematics control system 508, implement at least one machine learning model alone or in combination with one or more of the above-noted systems. In some examples, perception system 402, planning system 404, localization system 406, and/or control system 408, including telematics control system 508, implement at least one machine learning model as part of a pipeline (e.g., a pipeline for identifying one or more objects located in an environment and/or the like). An example of an implementation of a machine learning model is included below with respect to FIG. 6.

Database 410 stores data that is transmitted to, received from, and/or updated by perception system 402, planning system 404, localization system 406 and/or control system 408, including telematics control system 508. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 6:
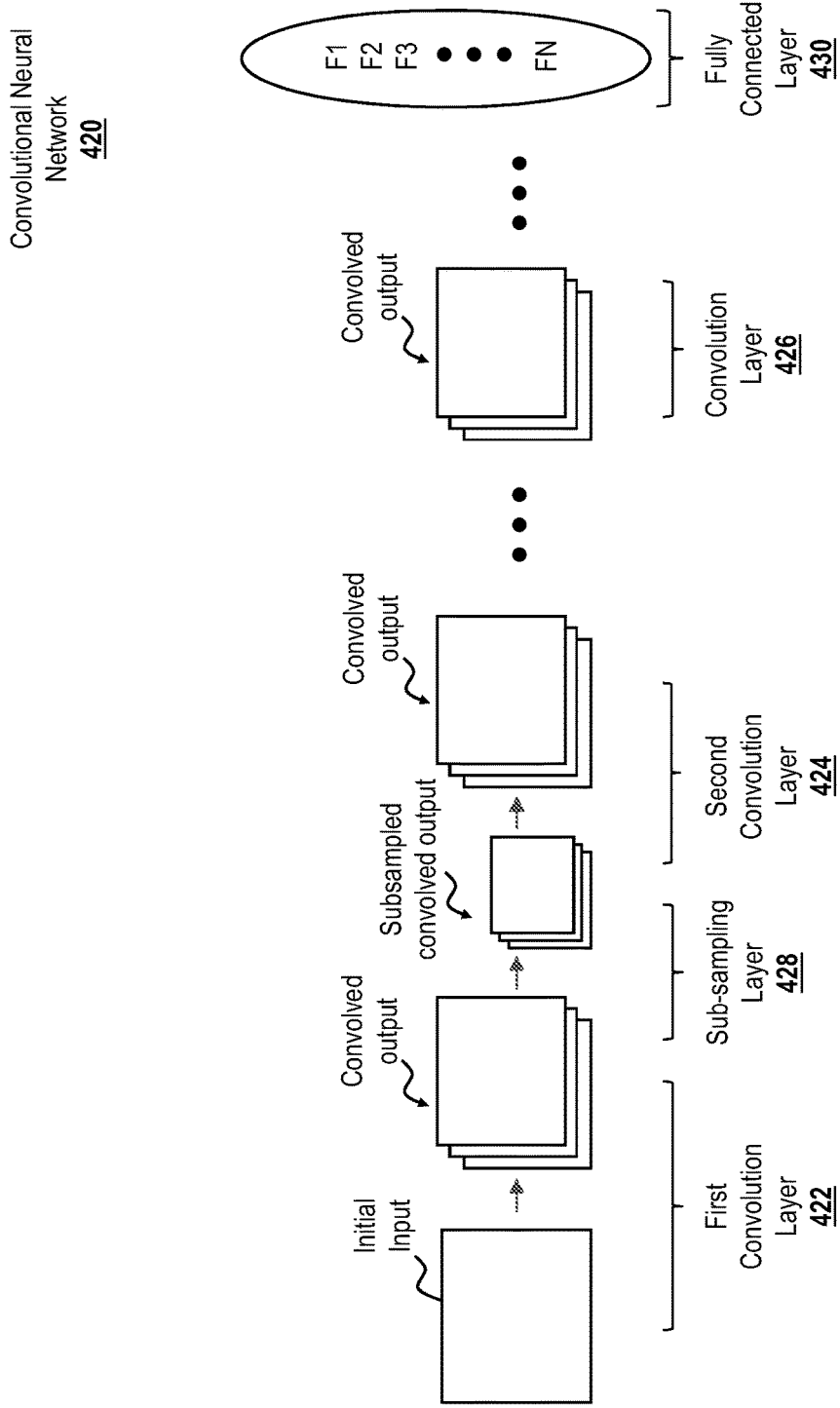
FIG. 6 is a diagram of an implementation of a neural network.

Referring now to FIG. 6, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408, including telematics control system 508. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like. A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 7:
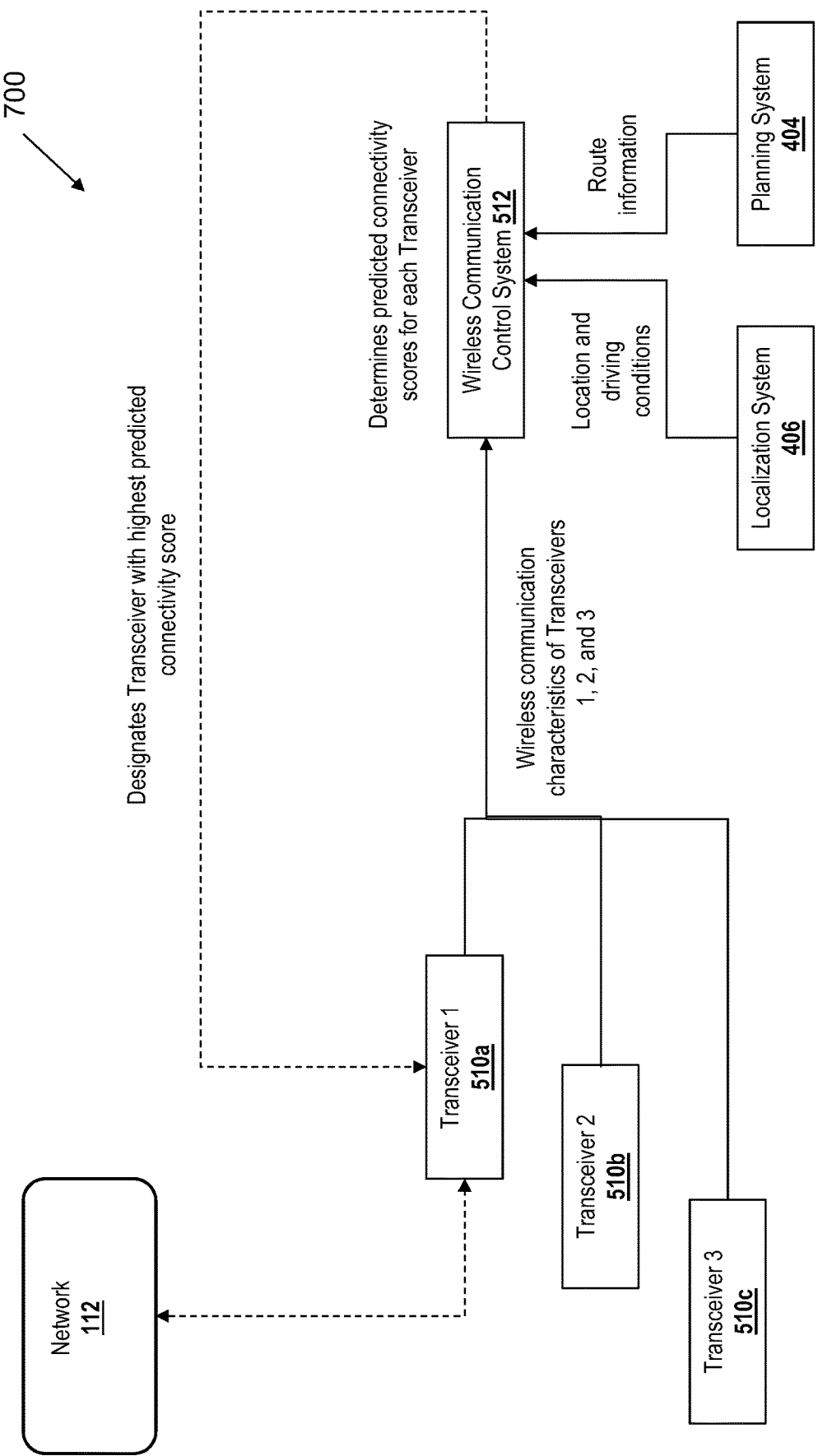
FIG. 7 is a diagram of an implementation of a process for enhanced proactive transceiver and carrier automated arbitration.

Referring now to FIG. 7, illustrated is a diagram of an implementation 700 of a part of a process for proactive transceiver and carrier automated arbitration, including selecting a transceiver (e.g., transceiver 510a-510c of FIG. 5) of a vehicle (e.g., vehicle 502 of FIG. 5) based on determined predicted connectivity scores (e.g., determined by a prediction model of the wireless communication control system 512). In some embodiments, implementation 700 includes control system 408, including telematics control system 508, localization system 406, planning system 404, AV compute 400, network 112, and/or vehicle 502. For example, telematics control system 508 includes at least two transceivers (e.g., modems), such as a first transceiver 510a, a second transceiver 510b, and a third transceiver 510c, as well as a wireless communication control system 512. The wireless communication control system 512 is configured to designate a transceiver to perform wireless communications (e.g., between the vehicle 502 and at least the network 112) based on determined current and/or predicted connectivity scores. The determined connectivity score for each transceiver provides an indication associated with a wireless connection quality and/or strength between each transceiver and at least the network 112 at a location and/or along a route. The wireless communication control system 512 selects the transceiver with the highest determined connectivity score to perform wireless communications for the vehicle 502. In some embodiments, the wireless communication control system 512 selects the transceiver with the highest determined connectivity score associated with a preferred carrier. In some embodiments, the vehicle does not have a preferred carrier and thus the wireless communication control system 512 does not consider associated carriers when selecting a transceiver to perform wireless communications for the vehicle.

As shown in FIG. 7, telematics control system 508 includes more than two transceivers in communication with the wireless communication control system 512. For example, the telematics control system 508 includes a first transceiver 510a associated with a first carrier, a second transceiver 510b associated with a second carrier, and a third transceiver 510c associated with a third carrier. For example, each carrier is associated with a wireless communication company that provides wireless communications to and/or from the network 112. In some embodiments, each of the transceivers is configured to provide wireless communications between the associated vehicle 502 and at least the network 112. The wireless communication control system 512 is configured to select one of the transceivers for performing wireless communications with at least the network 112.

Referring again to FIG. 7, the wireless communication control system 512 includes a prediction model (e.g., at least one machine learning model), such as a neural network (e.g., CNN 430, an encoder-decoder neural network, and/or the like), a regression model, an instance-based model, a regularization model, a decision tree, a random forest, a Bayesian model, a clustering model, an associative model, a dimensionality reduction model, and/or an ensemble model. The prediction model of the wireless communication control system 512 is trained to analyze at least one wireless communication characteristic (e.g., signal strength, latency, bandwidth, best available bands, signal-to-noise ratio) associated with each transceiver and location information (e.g., current location, planned driving route, traffic conditions, road conditions, weather) associated with the vehicle 502. For example, each transceiver provides the wireless communication control system 512 with at least one of a signal strength, a latency, a bandwidth, a best available bands, and other performance parameters (e.g., SNR) at one or more location and/or along one or more routes.

For example, wireless communication characteristic information is provided by each transceiver to the wireless communication control system 512 and associated with a location information (e.g., provided by the localization system 406), such as a current location and/or planned route, as well as at least one driving condition (e.g., traffic). In some embodiments, the localization system 406 provides the wireless communication control system 512 with the location (e.g., current location and/or planned locations along a route) and/or driving conditions (e.g., traffic, road conditions) associated with the vehicle. As such, the wireless communication control system 512 stores, and/or uses, by the prediction model, the received wireless communication characteristics associated with each transceiver along with the corresponding information provided by the localization system to determine connectivity scores for each transceiver.

For example, the first transceiver 510*a*, the second transceiver 510*b*, and the third transceiver 510*c* each provides at least one wireless communication characteristic to the wireless communication control system 512, as shown in FIG. 7. Additionally, the localization system 406 provides location information associated with the vehicle 502 and/or driving condition information associated with the vehicle 502. The prediction model of the wireless communication control system 512 associates the wireless communication characteristics associated with each transceiver with received location and driving condition information. In some embodiments, the wireless communication control system 512 receives route information from the planning system 404. The prediction model of the wireless communication control system 512 assigns connectivity scores to each transceiver, such as assigns connectivity scores to each transceiver at a location (e.g., provided by localization system 406) and/or along a route (e.g., provided by planning system 404), which are based on wireless communication characteristics. As such, the prediction model can include a map of connectivity scores associated with the first transceiver 510*a*, the second transceiver 510*b*, and the third transceiver 510*c*.

The wireless communication control system 512 utilizes the mapped connectivity scores from the prediction model when the vehicle is at a location and/or traveling along a route, such as in order to select a transceiver with a highest connectivity score for providing wireless communication (e.g., between vehicle 502 and at least the network 112). For example, the prediction model of the wireless communication control system 512 allows the wireless communication control system 512 to select a predicted best transceiver (e.g., having greatest wireless communication quality and signal strength) at a location and/or along a route and thus prevent poor wireless connection for the vehicle 502. For example, as shown in FIG. 7, the first transceiver 510*a* is determined to have the greatest predicted connectivity score, and is associated with a preferred carrier, at a location and/or along a route such that the wireless communication control system 512 selects the first transceiver 510*a* to wirelessly communicate with at least the network 112.

Figure 8:
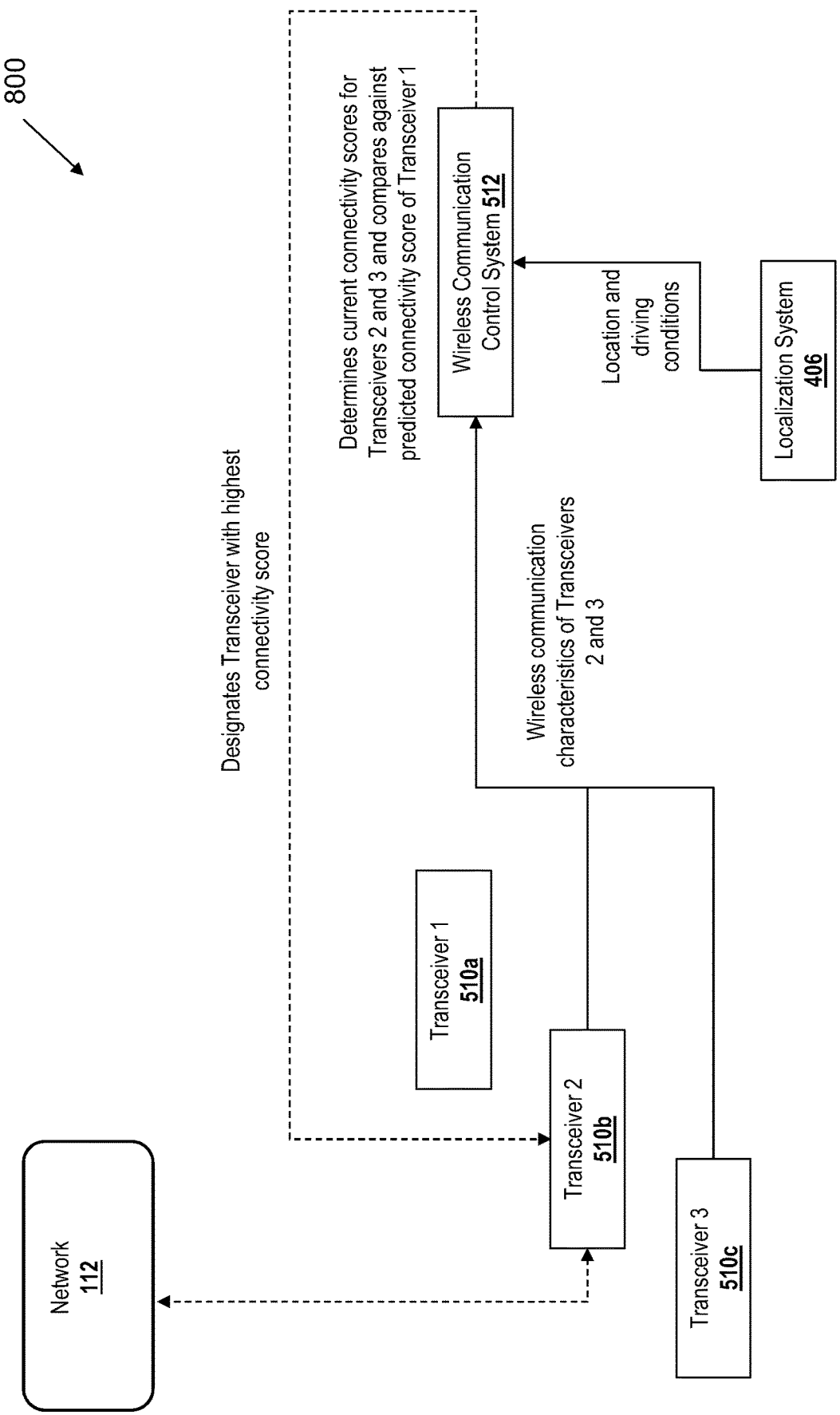
FIG. 8 is a diagram of an implementation of a process for enhanced proactive transceiver and carrier automated arbitration.

Referring now to FIG. 8, illustrated is a diagram of an implementation 800 of another part of a process for proactive transceiver and carrier automated arbitration, including determining at least one current connectivity score, such as to compare such determined current connectivity score against the predicted connectivity score. For example, the wireless communication control system 512 receives wireless communication characteristics associated with the second transceiver 510*b* and the third transceiver 510*c* (e.g., the transceivers not selected for providing wireless communications based on predicted connectivity scores), as well as receive current vehicle 502 location information (e.g., from localization system 406). The wireless communication control system 512 determines current connectivity scores (e.g., in approximately real-time) of the first and second transceivers (e.g., based on current vehicle location, current driving conditions, and current wireless communication characteristics associated with the second and third transceivers). The wireless communication control system 512 compares the current connectivity scores against the highest predicted connectivity score (e.g., first connectivity score), which allows the wireless communication control system 512 to determine whether the predicted connectivity score is greater than any of the determined current connectivity scores. As shown in FIG. 8, the wireless communication control system 512 will select the transceiver with the greatest associated connectivity score (e.g., predicted and/or current connectivity score), such as the second transceiver 510*b*. As such, the current connectivity score determinations and comparisons with the predicted best connectivity score can result in a change in selected transceivers for providing wireless communications. Such changes are stored in the predication model to update the prediction model.

Referring now to FIG. 9, illustrated is a flowchart of a process 900 for enhanced proactive transceiver and carrier automated arbitration for a vehicle (e.g., vehicle 502 of FIG. 5). In some embodiments, one or more of the steps described with respect to process 900 are performed (e.g., completely, partially, and/or the like) by AV compute 400, including control system 408, telematics control system 508, wireless communication control system 512, localization system 406, and/or planning system 404.

At 902, at least one processor (e.g., of telematics control system 508) receives route information (e.g., from planning system 404) associated with a current location of the vehicle 502 and/or planned mapped locations representing a route to be traveled by the vehicle 502. For example, the route information includes navigation coordinates and/or trajectories determined by the planning system 404. Alternatively or in addition, the localization system 406 provides current location information (e.g., GNSS data) associated with the vehicle to the at least one processor of the telematics control system 508.

At 904, using the at least one processor of the telematics control system 508, a prediction model that is generated and/or stored on-board the vehicle 502 (e.g., in the wireless communication control system 512 of FIG. 5) is used to determine a first connectivity score associated with a first transceiver (e.g., first transceiver 510*a* of FIG. 5). As indicated at 904, the at least one processor also determines a second connectivity score associated with a second transceiver (e.g., second transceiver 510*b* of FIG. 5). In some embodiments, connectivity scores, including the first and second connectivity scores, are based on at least one of a driving condition and a wireless communication characteristic associated with the route information. For example, the driving condition includes at least one of a traffic condition, a road condition, weather condition, time of day along the route. The wireless communication characteristics includes at least one of a signal strength, a latency, a bandwidth, a best available band, and a signal-to-noise ratio along the route.

At 906, using the at least one processor of the telematics control system 508, the first connectivity score is compared against the second connectivity score. For example, the at least one processor of the telematics control system 508, compares the first and second connectivity scores to determine whether the first or second transceiver has the higher connectivity score. For example, a higher connectivity score is associated with a greater signal strength and wireless communication between transceiver and at least the network 112. As such, the telematics control system 508 uses the determined connectivity scores to determine and select a transceiver having the greatest signal strength and wireless communication abilities.

At 908, using the at least one processor of the telematics control system 508, the first transceiver is selected for wirelessly connecting the vehicle along the route. For example, selection of the first transceiver is based on the first connectivity score being greater than the second connectivity score. In some embodiments, the wireless connection is between the transceiver, such as the first transceiver, and at least the network 112.

At 910, using the at least one processor of the telematics control system 508, a location information is received that represents a current location of the vehicle. For example, such current location information is provided by the localization system 406 and includes a mapped position or location (e.g., GNSS data).

At 912, using the at least one processor of the telematics control system 508 and the location information, a current second connectivity score of the second transceiver is determined. For example, the current second connectivity score is based on current driving conditions and a current location of associated with the vehicle 502.

At 914, using the at least one processor of the telematics control system 508, the current second connectivity score is compared against the first connectivity score. Such comparing determines whether the current connectivity score is lower than a highest predicted connectivity score (e.g., the first connectivity score). For example, if the current connectivity score is higher than the predicted connectivity score of the selected transceiver, the transceiver selection is updated.

At 916, using the at least one processor of the telematics control system 508, the vehicle is connected to the first transceiver or the second transceiver (e.g., for preforming wireless communications with at least the network 112) based on the comparison of the current second connectivity score and the first connectivity score. For example, if the current second connectivity score is higher than the first connectivity score, the telematics control system 508 selects the second transceiver for performing wireless communications to at least the network 112. If the current second connectivity score is less than the first connectivity score, no change is made to the transceiver selection for performing wireless communications.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle comprising:
    a first transceiver configured to provide wireless communications between the vehicle and at least a network;
    a second transceiver configured to provide wireless communications between the vehicle and at least the network;
    at least one processor communicatively coupled to the first transceiver and the second transceiver; and
    at least one memory storing instructions thereon that, when executed by the at least one processor, result in operations comprising:
        receiving route information representing a route to be traveled by the vehicle;
        determining based on a prediction model and the route information, a first connectivity score of the first transceiver and a second connectivity score of the second transceiver, wherein the prediction model is trained to generate the first connectivity score and the second connectivity score using wireless communication characteristics associated with the first transceiver and the second transceiver;
        comparing the first connectivity score against the second connectivity score;
        selecting based on the first connectivity score being greater than the second connectivity score, the first transceiver for wirelessly connecting the vehicle along the route;
        receiving from a localization system of the vehicle, a location information representing a current location of the vehicle;
        determining using the location information, a current second connectivity score of the second transceiver;
        comparing the current second connectivity score against the first connectivity score; and
        connecting based on the comparing the current second connectivity score against the first connectivity score, the vehicle to the first transceiver or the second transceiver for performing wireless communications.

2. The vehicle of claim 1, wherein the vehicle connects to the first transceiver if the first connectivity score is greater than the current second connectivity score, and the vehicle connects to the second transceiver if the current second connectivity score is greater than the first connectivity score.

3. The vehicle of claim 1, further comprising:
    updating the prediction model based on the determined current second connectivity score.

4. The vehicle of claim 1, wherein the selecting the first transceiver is further based on a type of carrier associated with the first transceiver.

5. The vehicle of claim 1, wherein each of the first connectivity score, the second connectivity score, and the current connectivity score is based on one or more of a geographical location, a driving condition, a signal strength, a latency, a bandwidth, an available band, and a signal-to-noise ratio.

6. The vehicle of claim 1, wherein the current second connectivity score is determined approximately in real-time.

7. The vehicle of claim 1, further comprising:
determining, using the location information, a current first connectivity score of the first transceiver;
comparing the current second connectivity score against the current first connectivity score; and
connecting, if the current second connectivity score is greater than the first connectivity score, the second transceiver to the vehicle.

8. The vehicle of claim 7, wherein the current first connectivity score is determined approximately in real-time.

9. The vehicle of claim 1, wherein at least one of the first transceiver and the second transceiver includes a modem.

10. The vehicle of claim 1, wherein the vehicle includes an autonomous vehicle.

11. The vehicle of claim 1, wherein the wireless communication characteristics comprise at least one of a signal strength, latency, bandwidth, best available bands, signal-to-noise ratio associated with each transceiver, and location information associated with the vehicle.

12. A method comprising:
receiving route information representing a route to be traveled by a vehicle;
determining based on a prediction model and the route information, a first connectivity score of a first transceiver and a second connectivity score of a second transceiver, wherein the prediction model is trained to generate the first connectivity score and the second connectivity score using wireless communication characteristics associated with the first transceiver and the second transceiver;
comparing the first connectivity score against the second connectivity score;
selecting based on the first connectivity score being greater than the second connectivity score, the first transceiver for wirelessly connecting the vehicle along the route;
receiving from a localization system of the vehicle, a location information representing a current location of the vehicle;
determining using the location information, a current second connectivity score of the second transceiver;
comparing the current second connectivity score against the first connectivity score; and
connecting based on the comparing the current second connectivity score against the first connectivity score, the vehicle to the first transceiver or the second transceiver for performing wireless communications.

13. The method of claim 12, wherein the vehicle connects to the first transceiver if the first connectivity score is greater than the current second connectivity score, and the vehicle connects to the second transceiver if the current second connectivity score is greater than the first connectivity score.

14. The method of claim 12, further comprising: updating the prediction model based on the determined current second connectivity score.

15. The method of claim 12, wherein the selecting the first transceiver is further based on a type of carrier associated with the first transceiver.

16. The method of claim 12, wherein each of the first connectivity score, the second connectivity score, and the current connectivity score is based on one or more of a geographical location, a driving condition, a signal strength, a latency, a bandwidth, an available band, and a signal-to-noise ratio.

17. The method of claim 12, wherein the current second connectivity score is determined approximately in real-time.

18. The method of claim 12, further comprising:
determining, using the location information, a current first connectivity score of the first transceiver;
comparing the current second connectivity score against the current first connectivity score; and
connecting, if the current second connectivity score is greater than the first connectivity score, the second transceiver to the vehicle.

19. The method of claim 18, wherein the current first connectivity score is determined approximately in real-time.

20. The method of claim 12, wherein at least one of the first transceiver and the second transceiver includes a modem.

21. The method of claim 12, wherein the vehicle includes an autonomous vehicle.

22. At least one non-transitory storage media storing instructions that, when executed by at least one processor, cause the at least one processor to perform operations comprising:
receiving route information representing a route to be traveled by a vehicle;
determining based on a prediction model and the route information, a first connectivity score of a first transceiver and a second connectivity score of a second transceiver, wherein the prediction model is trained to generate the first connectivity score and the second connectivity score using wireless communication characteristics associated with the first transceiver and the second transceiver;
comparing the first connectivity score against the second connectivity score;
selecting based on the first connectivity score being greater than the second connectivity score, the first transceiver for wirelessly connecting the vehicle along the route;
receiving from a localization system of the vehicle, a location information representing a current location of the vehicle;
determining using the location information, a current second connectivity score of the second transceiver;
comparing the current second connectivity score against the first connectivity score; and
connecting based on the comparing the current second connectivity score against the first connectivity score, the vehicle to the first transceiver or the second transceiver for performing wireless communications.

* * * * *